United States Patent [19]

Volk, Jr.

[11] Patent Number: 4,725,958

[45] Date of Patent: Feb. 16, 1988

[54] PELLET MILL CONTROLLER WITH NON-CONTACTING TEMPERATURE SENSOR

[75] Inventor: Joseph A. Volk, Jr., Creve Coeur, Mo.

[73] Assignee: Beta Raven Inc., Earth City, Mo.

[21] Appl. No.: 810,060

[22] Filed: Dec. 17, 1985

[51] Int. Cl.$^4$ .............................................. G06F 15/46
[52] U.S. Cl. ...................................... 364/468; 99/486; 364/172; 364/557
[58] Field of Search ............... 364/468, 469, 476, 477, 364/557, 172, 173; 137/2, 3; 99/486, 487, 488; 425/DIG. 230, 331; 426/454, 231, 512, 630, 635, 636; 241/34, 35

[56] References Cited

U.S. PATENT DOCUMENTS

| | | | |
|---|---|---|---|
| 3,932,736 | 1/1976 | Zarow et al. | 364/468 |
| 3,978,236 | 8/1976 | Sair et al. | 426/445 |
| 4,119,742 | 10/1978 | Stupec | 426/456 X |
| 4,340,937 | 7/1982 | Volk, Jr. | 364/468 |
| 4,424,016 | 1/1984 | Matsuda et al. | 425/144 |
| 4,463,430 | 7/1984 | Volk, Jr. et al. | 364/468 |

Primary Examiner—Joseph Ruggiero
Attorney, Agent, or Firm—Rogers, Howell, Moore & Haferkamp

[57] ABSTRACT

A non-contacting infrared temperature sensor is utilized in a control system for a pelleting apparatus to sense the temperature of the rotating die within the pellet mill and is used in connection with other temperature measurements to control the pelleting process.

9 Claims, 3 Drawing Figures

U.S. Patent  Feb. 16, 1988  4,725,958
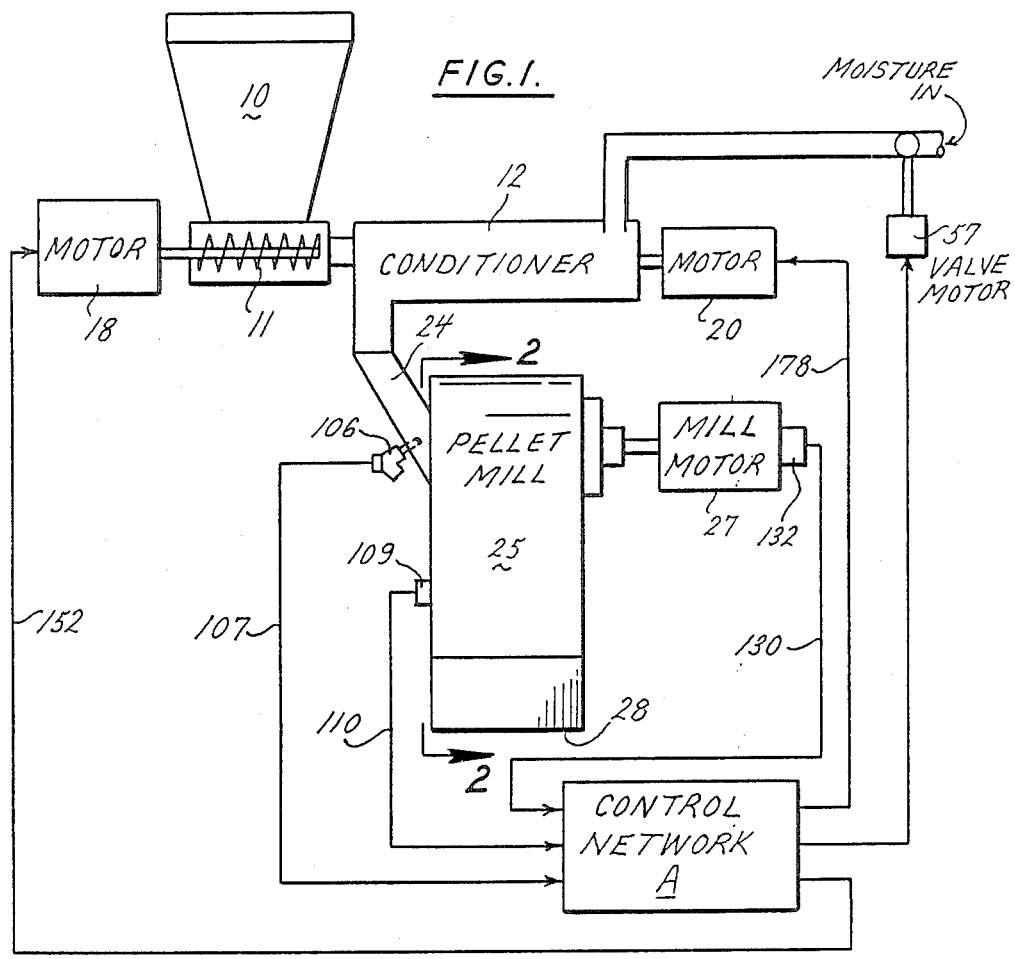
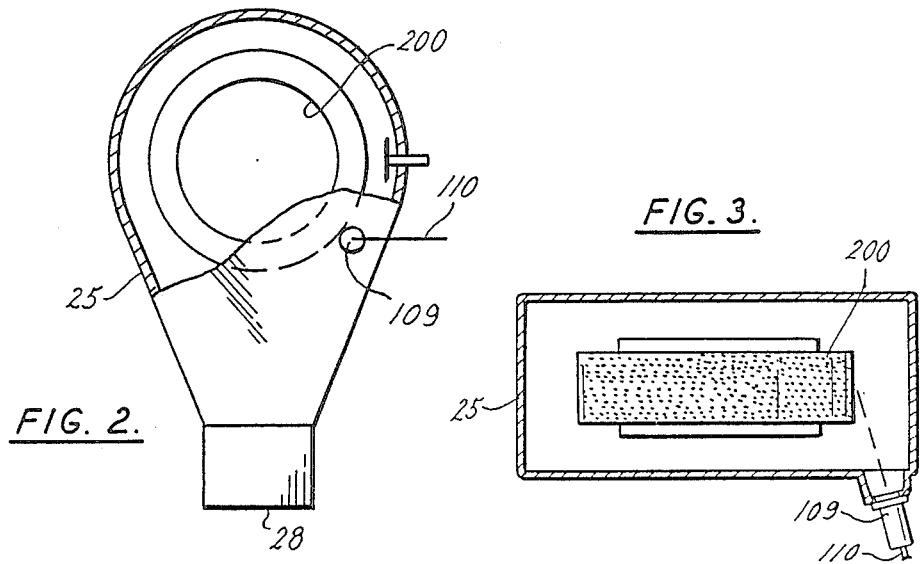

PELLET MILL CONTROLLER WITH NON-CONTACTING TEMPERATURE SENSOR

BACKGROUND AND SUMMARY OF THE INVENTION

The invention disclosed herein is an improvement to the inventor's prior automatic pellet mill controllers as disclosed and claimed in U.S. Pat. Nos. 3,932,736, 4,340,937 and U.S. Pat. No. 4,463,430, all of which were invented by the inventor herein and which are commonly owned by the assignee of the present invention. These prior patents are incorporated herein by reference.

The automatic pellet mill controllers disclosed in these prior patents essentially sense the temperature of the material as it is processed by the pelleting apparatus and at various points therealong, measures the difference between two of those sensed temperatures, and controls the operation of the pelleting apparatus by controlling the flow of ingredients therethrough. Of course, each of these systems has its own unique features and reference should be made directly to those prior patents for complete details of each system.

The temperature of the material is sensed at various points in the pellet apparatus through the use of direct contact temperature sensors, such as 106 or 109 as shown in the '937 patent which requires direct physical contact between the material and the temperature sensor to achieve an accurate measurement thereof. In the prior art, temperature sensors are available with stainless steel dual walled shielding to withstand the abrasive effect of the granular material as it rubbed against the temperature sensor. Although these temperature sensors do perform adequately, they represent an on-going maintenance requirement requiring periodic checking and replacement thereof to ensure continuous, satisfactory pelleting. Furthermore, at lower levels of production, there is an opportunity for air to partially surround the probe instead of material because there is an insufficient mass of material flowing through the system. This results in some inaccuracies in temperature measurement which, if not accounted for, can detract from the ability of the control to maximize production throughput and pellet quality.

To solve these and other difficulties encountered with using direct contact temperature probes in the prior art, the inventor herein has succeeded in adapting a non-contacting, IR sensing temperature sensor to the pellet mill controllers which sense the temperature of the material and use that parameter in controlling the pellet mill. The inventor has selected a Raytec TM Thermalert II TM Model No. T2L2 which senses the infrared frequencies emanating from the material to obtain a very accurate temperature reading of the material. Replacement of the direct contact temperature sensors of the inventor's prior systems, or for that matter other systems, eliminates the problems experienced therein. Additionally, the inventor has also discovered that there are advantages to sensing the temperature of the rotating die within the mill and using that temperature in combination with the temperature of the material as it enters the mill, much as in the manner of the $\Delta T$ mill control disclosed in the '937 patent mentioned above. When the mill is first started up, the die is cold, and its temperature is unknown until pellets are formed by the die and their temperature measured. Therefore, directly sensing the temperature of the die gives a direct indication of the temperature at which the first pellets will be formed, and will also directly follow the heating up of the die as the pelleting run continues. This provides for a smoother start-up of each pelleting run, and more accurate control of the pelleting process to produce good quality pellets even at the beginning of a run.

Still another advantage in using a noncontacting temperature probe to measure the temperature of the die is that pellets are formed by material being forced through the holes in the die so that the temperature of the pellet as it is formed is almost exactly the same temperature as that of the die. This pellet forming temperature is one of the critical parameters to be measured and controlled to achieve uniform pellets of good quality during a pelleting run. While the direct contact temperature probe utilized in prior systems does sense the temperature of the pellets shortly after leaving the die, there is an inherent advantage in sensing the temperature of the die which is the temperature of the pellet immediately as it is formed. This thereby eliminates any error from a variation in temperature of the pellet as it moves from the die to the direct contact temperature probe in the prior art.

The foregoing has been a brief summary description of some of the principal advantages and features of the present invention. A greater understanding and appreciation for further details of the invention may be obtained by referring to the drawings and description of the preferred embodiment which follow.

BRIEF DESCRIPTION OF THE DRAWINGS

FIG. 1 is a schematic view of a control incorporating the present invention;

FIG. 2 is a cross-sectional view of the pellet mill, taken along the plane of line 2—2 in FIG. 1, showing the positioning of a temperature sensor according to this invention; and FIG. 3 is a top view of the pellet mill further detailing the mounting of the temperature probe.

DETAILED DESCRIPTION OF THE PREFERRED EMBODIMENT

An automatic control for a pellet producing apparatus according to this invention is shown schematically in FIG. 1. This control is essentially the same as that shown in FIG. 1 of the inventor's prior U.S. Pat. No. 4,340,937, except that the temperature sensor 109 has been modified according to the improvement of this invention to sense the temperature of the die rather than the pellets.

There is shown a bin 10 for holding a supply of material from which pellets are to be made. In the case of feed pellets, the material is preferably in milled form and is composed from any of a great variety of animal feed formulations including the numerous ones most commonly used in the art. The milled material is fed by means of an appropriate feed screw 11, auger, gravimetric feeder, or the like, into a conditioner 12. The feed screw 11 is operated, or made to rotate, by means of a variable speed screw motor 18. The conditioner includes rotating paddles or the like to agitate and add turbulence to the material as the material moves therethrough. A motor 20 operates the agitator.

From the conditioner, the material is fed down a chute 24 and into a pellet mill or pellet producing means 25. The pellet mill 25 might, for example, be of the die type and comprise a rotating cylindrical die 200 with radial holes therein and rollers mounted within the die. The material is fed into the cylinder and by interaction of the die 200 and rollers is forced through the holes in the die 200 and severed to form pellets. The pellet mill is operated by a relatively high horsepower electric motor 27. After severing, the pellets fall through an opening 28 at the bottom of the mill.

Means are provided for supplying one or more moisture controlling ingredients to the material within the conditioner. These ingredients might, for example, include steam, water, dry heat, or some other suitable moisture controlling ingredient. The amount of such ingredient is controlled by a modulating control valve and motor 57 which in turn is controlled from output signals from a control network A.

The control network A may be that shown and described in the inventor's prior U.S. Pat. No. 3,932,736. The control network A also has outputs 152 and 178 to the feed screw motor 18 and conditioner motor 20 for purposes as described in the patent. Also, a transducer 132 is magnetically coupled to the mill motor 27, and a signal representing the load on the motor is carried by a conductor 130 to an input of the control network A.

As in the inventor's prior '937 patent, temperature sensor 106 senses the temperature of the material as it enters the mill and temperature sensor 109 senses the temperature of the material as it leaves the mill. However according to this invention, either one of these sensors may be, and in this preferred embodiment sensor 109 is, replaced with a sensor for sensing the temperature of the die. Because sensor 109 senses the temperature of the die instead of the material directly, the sensor does not have to be exposed to the flow of material and thus does not suffer the wear previously encountered. Thus, the control network can sense $\Delta T$ across the mill ($\Delta T$ mill), and control the valve and motor 57 to modulate the amount of moisture controlling ingredient mixed with the material in the conditioner in order to maintain $\Delta T$ mill within prescribed limits.

The sensor for measuring the temperature of the die can be any temperature measuring device including thermocouples or thermistors. Preferably, however, the sensor is a non-contacting temperature sensor, such as an infrared non-contacting temperature sensor. This probe is installed at any convenient spot where infrared energy from the face of the die can reach the sensor. For optimum performance, the sensor should be aimed to sense across the outside face of the die to sense the temperature of the pellets immediately as they exit the die, as shown in FIG. 3. For example, the sensor can be mounted on the outer door of a mill on the lower right hand quadrant. The output of the sensor is an analog voltage which is fed into the control network in place of the pellet temperature probe signal of the prior art systems.

There are various changes and modifications which may be made to the invention as would be apparent to those skilled in the art. However, these changes or modifications are included in the teaching of inventor's disclosure, and it is intended that the invention be limited only by the scope of the claims appended hereto.

I claim:

1. In an automatic control system for a pelleting apparatus, the apparatus including a pellet producing means and means for feeding a supply of material to the producing means, the pellet producing means including a rotating die through which the material is pressed by at least one roller to form pellets, the die being contained within a chamber, the control system including a plurality of temperature sensing means, said plurality of temperature sensing means being mounted at different positions on said pelleting apparatus to sense the temperature of the material thereat, means for measuring the difference between at least two of said temperatures, and means to automatically control the proportion of selected ingredients of the material before entering the producing means in response to said temperature differential, the improvement comprising at least one of said temperature sensing means having means to sense the temperature of the material as it emerges from the die face and before it is severed.

2. The device of claim 1 wherein said at least one temperature sensing means has means to detect the infrared energy emanating from said material.

3. The device of claim 1 wherein at least one other of said temperature sensing means is positioned to sense the temperature of the material near the input to the pellet producing means.

4. An automatic control system for a pelleting apparatus, the pelleting apparatus including a pellet producing means and means for feeding a supply of material to the producing means, the pellet producing means including a rotating die through which the material is pressed by at least one roller to form pellets, said die being contained within a chmaber, the control system including means for sensing the temperature of the material near the input of the producing means, means to sense the temperature of the die, means for measuring the difference between said temperatures, and means for automatically controlling the proportion of selected ingredients of the material before entering the producing means in response to said temperature differential.

5. The device of claim 4 wherein the die temperature sensing means has means to sense the temperature of the die without physically contacting the die.

6. The device of claim 5 wherein the die temperature sensing means has means to detect the infrared energy emanating from the die.

7. The device of claim 4 wherein the die temperature sensing means is an IR temperature sensing means mounted to point towards the die.

8. The device of claim 4 wherein the rotating die has an outer face and a plurality of holes extending through said face, the roller forcing the material through said holes to form said pellets, the die temperature sensor being mounted to the chamber and comprising a non-contacting temperature probe oriented at an angle towards a portion of the die face where the pellets emerge through said holes.

9. The device of claim 1 wherein said at least one temperature sensor has means to sense the temperature of the material without contacting same.

* * * * *